March 22, 1966  R. MARINDIN  3,241,861
TRACTOR HITCH CONSTRUCTION
Filed March 18, 1963  4 Sheets-Sheet 3

FIG.3

INVENTOR
ROBERT MARINDIN
BY Julian Schachner
ATTORNEY

March 22, 1966  R. MARINDIN  3,241,861
TRACTOR HITCH CONSTRUCTION
Filed March 18, 1963  4 Sheets-Sheet 4

INVENTOR
ROBERT MARINDIN
BY Julian Schachner
ATTORNEY

United States Patent Office 3,241,861
Patented Mar. 22, 1966

3,241,861
TRACTOR HITCH CONSTRUCTION
Robert Marindin, Doncaster, England, assignor to International Harvester Company, Chicago, Ill., a corporation of New Jersey
Filed Mar. 18, 1963, Ser. No. 265,806
Claims priority, application Great Britain, Mar. 19, 1962, 10,391/62
15 Claims. (Cl. 280—479)

This invention relates to tractors, and is particularly concerned with improvements in tractors of the kind having implement hitch means, e.g., of the three-point type, comprising a pair of laterally spaced lower links pivoted to the tractor to extend rearwardly therefrom and operable by power lift means connected to said lower links by lift links for raising and lowering an implement connected to said hitch means, and a trailer hitch connection comprising a structure pivoted at its front end to the tractor to extend rearwardly beneath the rear axle thereof and having at its rear end a pick-up hook or like device arranged to be engageable with an eye or the like on a trailer drawbar when raised from a lower ground-engaging position to an elevated towing position.

In assignee's prior U.S. Patent No. 2,912,258 issued Nov. 10, 1959, it has been proposed to provide the trailer hitch structure with laterally spaced pivots with which the lower links of the implement hitch links are engageable when disengaged from pivots on the tractor so that the trailer hitch structure may be raised and lowered by means of the power lift means of the tractor operating through lift arms and lift links depending from the arms and pivotally connected to said lower links of the implement hitch means. When the lower links of the implement hitch means are engaged with pivots on the tractor, they extend rearwardly for the support of an implement which can be raised and lowered by operation of the power lift means. When the tractor is to be used with a trailer and the implement is disconencted, the lower links of the implement hitch means are disengaged from the pivots on the tractor and engaged with the pivots on the trailer hitch structure to form part of a linkage connecting the power lift means with the trailer hitch structure.

It has been found that the use of the arrangement described in the prior patent referred to cannot in practice be easily applied to any tractor design owing to substantial differences in other designs of tractors of the relative dimensions and positions of components, e.g., the lower links of the implement hitch means, the hitch points, and lifting link length. Great difficulty can be experienced in adapting the arrangement to a tractor for which it is not specifically designed to ensure that when the power lift means is connected to the trailer hitch structure, the trailer hitch structure will be in an upper operative position in which it is engageable by latching means when the power lift means is substantially at an upper "hold" position.

The present invention has for its object to provide an improved arrangement which is readily applicable for use with any tractor and implement hitch linkage design and, further, to provide improved latching means for positively retaining the trailer hitch structure in an upper position.

According to the present invention there is provided a tractor having hitch means comprising lower links selectively engageable at their respective inner ends with implement hitch pivots on the tractor or with a trailer hitch structure pivoted to the tractor so that when said lower links are engaged with said trailer hitch structure said trailer hitch structure can be raised and lowered by operation of power lift means connected to said lower links, wherein there is further provided a radius arm structure articulated to the tractor above the trailer hitch structure and articulated to said lower links at or near the respective outer ends thereof.

The arrangement may be such that in the lifted position of the trailer hitch structure, the radius arm structure extends rearwardly from the point of articulation with the tractor substantially horizontally. The geometrical relation of the linkage is such that for any given lift movement of the power lift means, the height to which the trailer hitch structure is lifted depends on the length of the radius arm structure. The longer the radius arm, the higher the trailer hitch structure will be lifted, or vice versa. Thus, the arrangement according to the invention can be readily adapted for any design of tractor by using a radius arm structure of suitable length having regard to the relative dimensions and positions of the components of the implement hitch means.

According to a further feature of the invention, manually releasable latching means is provided for positively retaining the trailer hitch structure in the raised position. The latching means comprises a pivoted latch member arranged to contact a pin on the trailer hitch structure to prevent its disengagement from a pivoted support hook, the latch member being disengageable from said pin by manually operable means acting also to swing the support hook out of engagement with said pin.

Preferred embodiments of the invention will now be described with reference to the specification and to the accompanying drawings, in which:

FIGURE 3 is a side elevation illustrating an alternative arrangement of linkage according to the invention.

Figure 1:
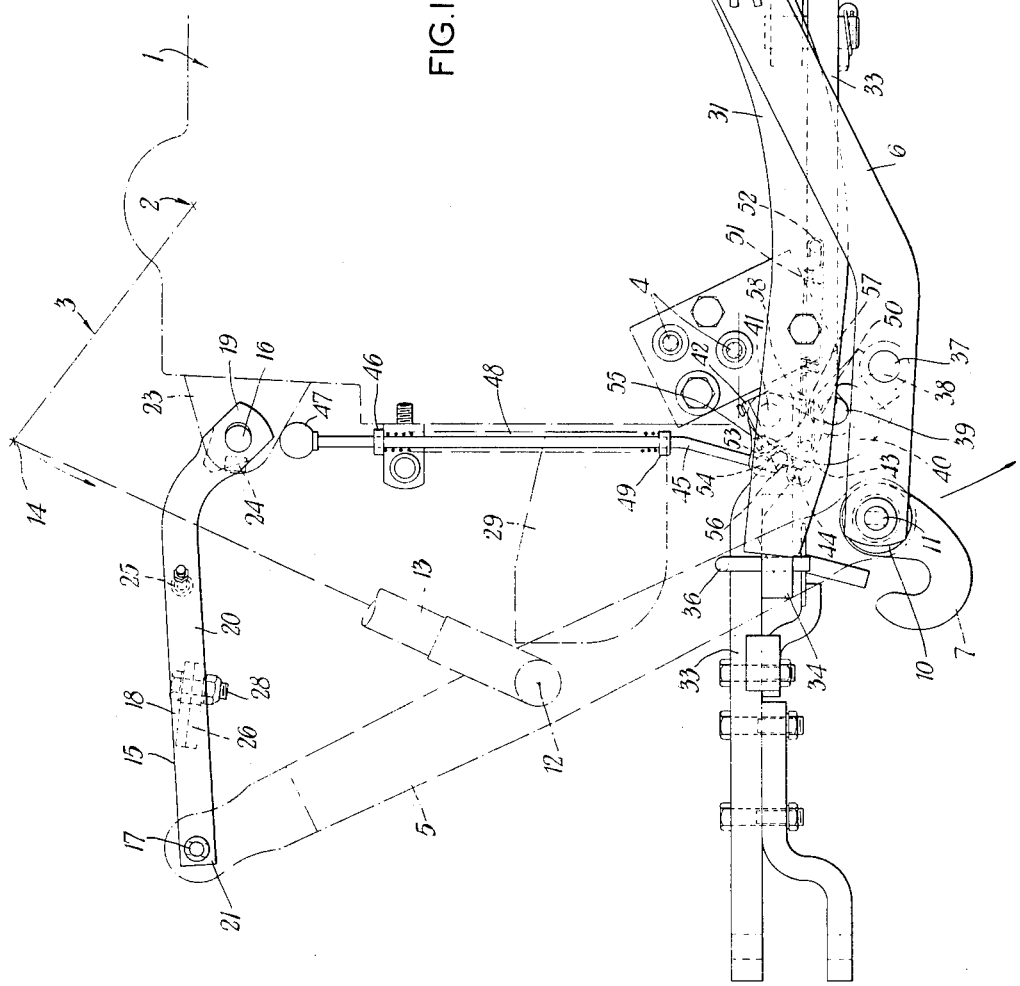
FIGURE 1 is a side elevation illustrating one arrangement of linkage according to the invention for operating a trailer hitch structure by the power lift means of a tractor utilizing the lower links of the implement hitch means.

Referring first to the drawings accompanying the specification, there is shown a tractor 1, indicated in broken lines, provided with power lift means including a transverse rockshaft 2 and lift arms 3, pivots 4 for the connection of lower links 5 of a three-point implement hitch means when operating an implement, and a trailer hitch structure 6 provided at the rear end with a pick-up hook 7, and at the front end adapted to engage pivots 8 and held in place by spring retainers 9. The trailer hitch structure 6 comprises lateral members connected at the rear end by a cross member 10 having a reduced extension at each end providing a pivot 11.

The lower links 5 of the implement hitch means, when disengaged from the pivots 4 on the tractor and not used for supporting an implement, are engageable, as shown, with the pivots 11, the links 5 being pivoted at 12 in a mid position in their length to lift links 13 connected to the lift arms 3 at 14.

In accordance with the invention, a radius arm structure 15 is articulated to the tractor at 16 and is provided with laterally extending pivots 17 for articulation with the upper or outer ends of the links 5, as shown. The length of the radius arm structure between the pivots 16 and 17 is selected having regard to the relative dimensions and positions of the components of the implement hitch structure so that the upper "hold" position of the power lift will correspond substantially to the raised position of the trailer hitch structure 6.

Figure 2:
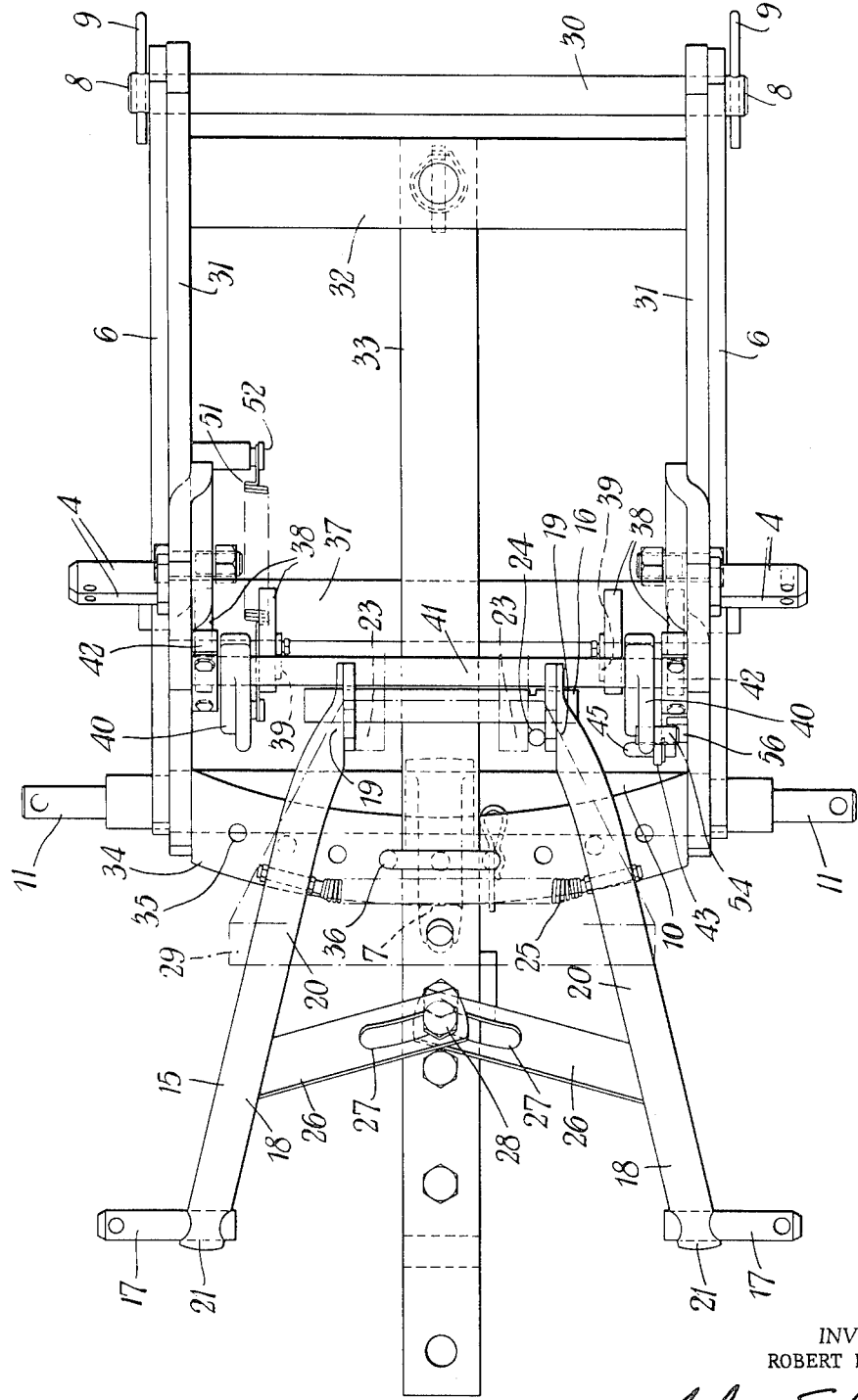
FIGURE 2 is a plan view corresponding to FIGURE 1.

The radius arm structure 15, as shown more particularly in FIGURE 2, may comprise a pair of arms 18 having parallel forward end portions 19, main rearwardly extending and outwardly divergent portions 20, and outer substantially parallel portions 21 provided with the pivot pins 17. The forward end portions 19 are formed with holes for engaging over the ends of the pivot pin 16 fixedly mounted in brackets 23 on the tractor. Fulcrum pins 24 secured to the inner faces of the portions 19 engage the outer side faces of the brackets 23. The holes in the portions 19 have substantial clearance on the pivot pin 16.

When the links 5 are connected, as shown, between the trailer hitch structure 6 and the radius arm structure 15, any vertical force exerted on the links 5 by the power lift means will tend to urge the outer ends of the arms 18 apart in view of the fact that the lateral spacing of the pivot pins 14 is greater than the lateral spacing of the pivots 17. A spring 25 is connected between the main portions 20 of the arms 18 so as to urge the forward end portions 19 of the arms towards one another and thereby maintain the blocks 24 in engagement with the outer faces of the brackets 23.

The two arms 18 are connected adjacent their outer ends by a pair of inwardly extending members 26 provided with slots 27 engageable by a pin 28, the arrangement being such that when the links 5 are detached from the pivots 17, the arms 18 can be drawn together to the extent permitted by the slots 27 so that when the radius arm structure 15 is depending from the pivot pin 16, the arms 18 will engage resiliently around the shield 29 of a power take-off of the tractor.

After disconnecting the links 5 from the radius arm structure 15, the latter can be readily detached from the tractor by pulling the forward ends of the arms 18 apart against the action of the spring 25 so as to disengage from the ends of the pivot pin 16. To facilitate disengagement of the arms 18 from the pivot pin 16, the slot 27 in each member 26 is curved on an arc centred on the fulcrum pin 24 adjacent the respective end of the pivot pin 16 so that when being removed, each arm 18 can pivot about is associated pin 24.

The pivots 8 carrying the trailer hitch structure 6 may be provided by extensions of a cross bar 30 carried by side members 31 of a framework including a cross member 32 for the pivotal connection of a drawbar 33 and a cross member 34 at the rear end provided with holes 35 and positioning means 36 for locating the drawbar 33 in various angular positions.

The trailer hitch structure 6 comprises a cross shaft 37 provided adjacent each end with pairs of lugs 38. Between each pair of lugs 38 is fitted a pin 39 which is engageable with a support hook 40 fixed on a cross shaft 41 carried in bearings 42 fixed to the side members 31. At one side, e.g., the right-hand side of the tractor looking forwardly, a latch member 43 is pivotally mounted on the shaft 41 between the adjacent support hook 40 and the bearing 42. The latch member 43 is pivotally connected at 44 to an upwardly extending rod 45 located at its upper end in a bracket 46 and provided with a hand knob 47. A spring 48 extends between the bracket 46 and a collar 49 on the rod 45 so as to urge the rod downwardly.

The latch member 43 is formed with a cam face 50 which contacts the upper part of the respective pin 39 so that it cannot disengage from the support hook 40. A spring 51 connected between the latch member 43 and an anchorage 52 normally urges the latch member to the locked position shown.

To lower the pick-up hook 7 to the ground, the operator pulls the knob 47 upwardly and the latch member 43 is moved angularly clockwise about the shaft 41 until a face 53 contacts a pin 54 carried by a projecting portion 55 of the support hook 40. This movement disengages the cam face 50 from the pin 39. The hydraulic system is then put to "lift" which raises the trailer hitch structure 6, and as the pins 39 are lifted out of the support hooks 40, further upward movement of the rod 45 will move both the latch member 43 and the support hooks 40 in a clockwise direction to completely disengage the support hooks 40 from the pins 39. While still holding the support hooks 40 in the disengaged position, the hydraulic system is then put to "lower" and the trailer hitch structure 6 will then be lowered to a position below that shown in FIGURE 1. On releasing the knob 47 the support hooks 40 will be rotated anti-clockwise until the pin 54 engages a stop 56 extending from the respective side member 31 of the drawbar structure. The stop 56 is to ensure that when the trailer hitch structure is raised, the pins 39 will engage the support hooks 40 at the front thereof.

To raise the trailer hitch structure 6 the hydraulic system is put to "lift" and as the structure approaches the raised position, the pins 39 contact the front faces of the support hooks 40 and cause the hooks 40 and shaft 41 to rotate in a clockwise direction against the resistance of the spring 51. As soon as the support hooks 40 can pass under the pins 39, the spring 51 acts to rotate the support hooks 40 and shaft 41 in an anti-clockwise direction until the pins 39 contact the faces 57 of the support hooks 40 and a face 58 of the latch member 43. The hydraulic system is then put to "lower" and the spring 51 will cause the support hooks 40 and shaft 41 to rotate anti-clockwise so that the pins 39 moves into the fully engaged position with the support hooks 40 to support the weight of the trailer hitch structure 6. As the pin 39 falls below the lower end of the face 58 of the latch member 43, the latch is moved anti-clockwise about the shaft 41 by the action of the spring 48 so as to contact the top of the pin 39 and hold it in the locked position. Thus, when the trailer hitch structure is in the raised position, it is impossible to accidentally raise the hitch structure further. This feature is necessary on any tractor equipped with "position control" and "automatic draft control" for the following reasons: the trailer hitch structure is normally raised by means of the "position control" to its fully raised position where the hydraulic system is automatically put to "hold" by means of a cam in the rockshaft. If the rockshaft is rotated further as by accidental lifting movement of the trailer hitch structure, it is possible to move the valve of the hydraulic lift beyond the "hold" position to "lower" position. This would have no effect upon the trailer hitch structure which would be supported by the hooks 40. Should a hydraulic loader be connected to an auxiliary tapping controlled by the "position control" lever, it would be caused to lower, which is undesirable and could possibly be dangerous.

Figure 4:
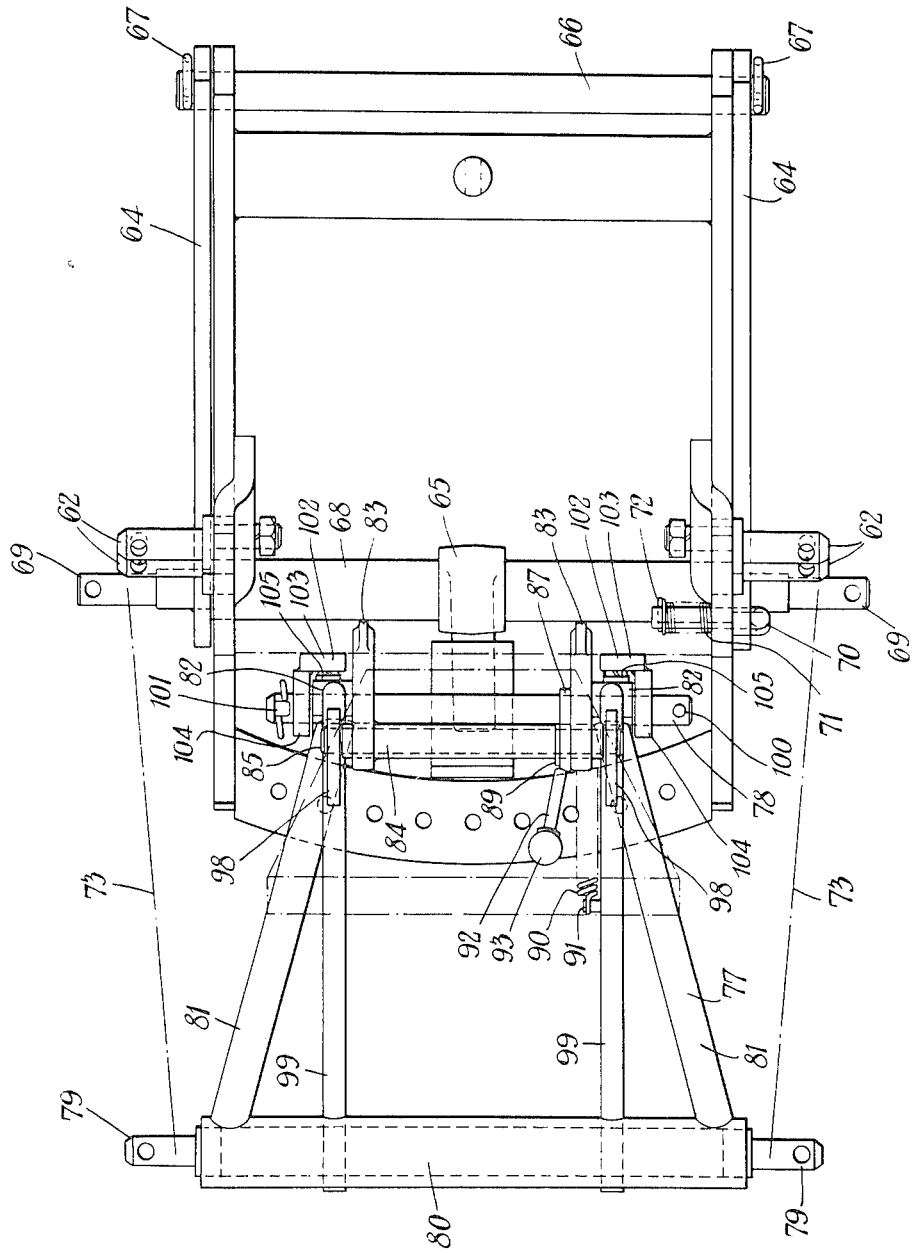
FIGURE 4 is a plan view corresponding to FIGURE 3.

Referring now to FIGURES 3 and 4 in the accompanying drawings, there is here shown a linkage system generally similar to that of FIGURES 1 and 2 in structure and operation, but with a modified radius arm structure and a differently disposed support hook and latch member assembly. In FIGURES 3 and 4 the tractor 59, indicated by broken lines, is provided with power lift means including a transverse rockshaft 60 and lift arms 61, pivots 62 for the connection of lower links 73 when operating an implement hitch and a trailer hitch structure 64 provided at the rear end with a pick-up hook 65 and at the front end adapted to engage pivots 66 and held in place by spring retainers 67. The trailer hitch structure 64 comprises lateral members connected at the rear by a cross member 68 having a reduced extension at each end providing a pivot 69. A peg 70 spring loaded by spring 71 which is held in position by a cotter and washer 72 and having a U-shaped part engageable in a non-movable part of the tractor is provided in the right hand lateral member locking forward to hold the implement hitch means 64 when not in use. A trailer hitch retainer 106 is provided to prevent the accidental escape of the trailer hitch.

The lower links 73, when disengaged from the pivots 62 on the tractor and not used for supporting an implement, are engageable as shown, with the pivots 69, and the links 73 being pivoted at 74 in an approximately central position in their length to lift links 75 connected to lift arms 61 at 76.

A radius arm structure 77 is pivotally connected to the tractor 59 at 78 and is provided with laterally extending pivots 79 for engagement with the upper or outer ends of the links 73 as shown.

The length of the radius arm between the pivots 78 and 79 and the position of the pivots 78 is selected having regard to the relative dimensions and positions of the components of the hitch structure, so that an intermediate upper or "hold" position of the power lift will correspond substantially to the raised position of the trailer hitch structure 64.

The radius arm structure 77 cmprises a transversely positioned member 80 reduced at each end to form a pivot 79. Main inwardly converging arms 81 are provided with bearings 82.

Support hooks 83 and tube 84 are welded together to pivot on a shaft 85 and are engageable with a pin 86 to support the load on hook 65. A latch member 87 formed with a cam face 88 to contact pin 86 and arranged to pivot on tube 84, being restrained from sideways movement by washer 89, is provided to prevent disengagement of the support hooks 83 from pin 86. A spring 90 connected between the latch member 87 and an anchorage 91 normally urges the latch member to the locked position shown.

The latch member 87 is provided with an operating lever 92 and hand knob 93 and a pin 94 is arranged to engage with abutments 95 and 96 formed on support hooks 83. Also engaging with the abutments 95 and 96 is a stop pin 97 fixed to side plates 98 and arranged to limit the rotational movement of support hooks 83.

Side plates 98 are carried on upwardly arched support members 99 arranged to take the forces resulting from supporting the weight of the trailer hitch structure 64.

Attachment of the radius arm structure 77 to the tractor 59 is achieved by means of a pin 78 provided with a handle 100 at one end and a cotter pin 101 at the other. Pin 78 passes through bearings 82. Attaching brackets 102 consisting of plate 103 and bearing 104 are fixed to tractor 59 by bolt 105. The radius arm structure 77 is thus quickly detachable by removing cotter pin 101 and withdrawing pin 78. To lower the pick-up hook 65 to the ground the hand knob 93 is depressed in an anticlockwise direction against the action of spring 90 until pin 94 contacts the face of abutment 96 formed on hook 83. This movement disengages cam face 88 from pin 86.

The hydraulic system is then put to "lift" which raises the trailer hitch structure 64 causing the radius arm structure 77 to rotate about the pivot 78 in a clockwise direction thus relieving any load on support hooks 83 and creating a clearance between support hooks 83 and pin 86. Further movement of knob 93 will now move both the latch member 87 and support hooks 83 in an anti-clockwise direction until abutment 95 contacts fixed stop 97.

While still holding the support hooks 83 in the disengaged position the hydraulic system is put to "lower" whereupon the trailer hitch structure 64 will be lowered to ground level, by anti-clockwise rotation of radius arm structure 77 about pivot 78. On releasing the knob 93 support hooks 83 will rotate clockwise about shaft 85 under their own weight until abutment 96 contacts fixed stop 97. Latch member 87 will continue to rotate under the action of spring 90 until pin 94 contacts abutment 95.

The stop 97 is to ensure that support hooks 83 are in a position suitable for automatic engagement with pin 86.

To raise the trailer hitch structure 64 the hydraulic system is put to "lift," causing the hitch structure to rotate about pivot 66 in a clockwise direction. The radius arm structure 77 being connected to the trailer hitch structure 64 by lower link 73 is likewise caused to rotate in an upward and clockwise direction about pivot 78. Thus the front cam faces of support hooks 83 contact pin 86 causing the hooks 83, tube 84 and latch member 87 to rotate anti-clockwise about shaft 85 against the action of spring 90.

When the support hooks 83 can pass to the front of pin 86 are caused to rotate in a clockwise direction until face 106 contacts pin 86 by the combined actions of their weight and spring 90 acting as already stated.

The hydraulic system is put to "lower" causing the support hooks 83 to fully engage with pin 86 to support the weight of the trailer hitch structure 64. As the hooks 83 engage fully the pin 86, the latch member 87 is rotated anti-clockwise about tube 84 by the action of pin 86. Upon full engagement latch 87 is rotated clockwise about tube 84 by the action of spring 90 until face 88 abuts pins 86.

What is claimed is:

1. In a tractor having hitch means including implement hitch pivots connected with the tractor and a trailer hitch structure including trailer hitch pivots, said trailer hitch structure being connected with the tractor, a pair of lower links selectively engageable at their respective inner ends with said pivots, and power lift means connectable with said lower links for raising and lowering said trailer hitch structure, the improvement comprising radius arm means articulated to the tractor above said trailer hitch structure and articulated to said lower links contiguous to the respective outer ends thereof.

2. The invention as claimed in claim 1 wherein the radius arm structure comprises a pair of arms provided at their respective outer ends with laterally extending pivots engageable with the respective outer ends of said lower links and the respective inner ends of said arms being adapted for engagement with pivot means on the tractor, spring means being arranged to bias the respective inner ends of the arms toward one another for retaining the same in engagement with the pivot means on the tractor.

3. The invention as claimed in claim 2 wherein the arms are mutually connected by means adapted to permit movement of the respective outer ends of the arms toward one another whereby the laterally extending pivots will be disengaged from the respective outer ends of the lower links.

4. The invention as claimed in claim 1 wherein the radius arm structure comprises a pair of arms joined at or near their respective outer ends by a transverse member the ends of which are of reduced diameter to provide laterally extending pivots engageable with the respective outer ends of said lower links, the respective inner ends of said arms being releasably pivotally connectible with bearing means on the tractor.

5. The invention as claimed in claim 4 wherein said bearing means comprises a pair of laterally spaced apertured brackets projecting from the tractor and a pin engageable through the apertures in the brackets and apertures in said respective inner ends of said arms, the pin being provided with stop means at each of its ends adapted to prevent withdrawal of the pin from said bearing means and at least one of said stop means being disengageable to permit withdrawal of said pin from said bearing means whereby said arms may be released from said bearing means.

6. The invention as claimed in claim 1 and further comprising manually releasable latching means adapted positively to retain the trailer hitch structure in an intermediate raised position, the latching means comprising a pivoted latch member arranged to contact a pin selectively mountable on the hitch means and the tractor to prevent disengagement of said pin from a support hook selectively pivoted to the tractor and the hitch means respectively, the latch member being disengageable from said pin by manually operable means acting also to swing the support hook out of engagement with said pin whereby said trailer hitch structure may be lowered by said power lift means and said support hook having a cam face arranged to contact said pin when said trailer hitch means is raised by said power lift means, whereby the hook is displaced against the action of spring means to permit said trailer hitch means to be brought to a fully raised position by said power lift means and thereafter said hook is caused to resume an operative position under the action of said spring means to engage said pin when the trailer hitch means is lowered from its fully raised position by the power lift means.

7. The invention as claimed in claim 6 wherein the support hook and latch member are pivotally mounted on the tractor and arranged to engage a pin on the trailer hitch structure.

8. The invention as claimed in claim 6 wherein the support hook and latch member are pivotally mounted on the radius arm structure and are arranged to engage a pin on the tractor.

9. The invention as claimed in claim 8 wherein the support hook and latch member are pivotally mounted on an upwardly arched support member included in the radius arm structure.

10. The invention as claimed in claim 2 and further comprising manually releasable latching means adapted positively to retain the trailer hitch structure in an intermediate raised position, the latching means comprising a pivoted latch member arranged to contact a pin selectively mountable on the hitch means and the tractor to prevent disengagement of said pin from a support hook selectively pivoted to the tractor and the hitch means respectively, the latch member being disengageable from said pin by manually operable means acting also to swing the support hook out of engagement with said pin whereby said trailer hitch structure may be lowered by said power lift means and said support hook having a cam face arranged to contact said pin when said trailer hitch means is raised by said power lift means, whereby the hook is displaced against the action of spring means to permit said trailer hitch means to be brought to a fully raised position by said power lift means and thereafter said hook is caused to resume an operative position under the action of said spring means to engage said pin when the trailer hitch means is lowered from its fully raised position by the power lift means.

11. The inventilon as claimed in claim 10 wherein the support hook and latch member are pivotally mounted on the tractor and arranged to engage a pin on the trailer hitch structure.

12. The invention as claimed in claim 3 and further comprising manually releasable latching means adapted positively to retain the trailer hitch structure in an intermediate raised position, the latching means comprising a pivoted latch member arranged to contact a pin selectively mountable on the hitch means and the tractor to prevent disengagement of said pin from a support hook selectively pivoted to the tractor and the hitch means respectively, the latch member being disengageable from said pin by manually operable means acting also to swing the support hook out of engagement with said pin whereby said trailer hitch structure may be lowered by said power lift means and said support hook having a cam face arranged to contact said pin when said trailer hitch means is raised by said power lift means, whereby the hook is displaced against the action of spring means to permit said trailer hitch means to be brought to a fully raised position by said power lift means and thereafter said hook is caused to resume an operative position under the action of said spring means to engage said pin when the trailer hitch means is lowered from its fully raised position by the power lift means.

13. The invention as claimed in claim 12 wherein the support hook and latch member are pivotally mounted on the tractor and arranged to engage a pin on the trailer hitch structure.

14. The invention as claimed in claim 5 and further comprising manually releasable latching means adapted positively to retain the trailer hitch structure in an intermediate raised position, the latching means comprising a pivoted latch member arranged to contact a pin selectively mountable on the hitch means and the tractor to prevent disengagement of said pin from a support hook selectively pivoted to the tractor and the hitch means respectively, the latch member being disengageable from said pin by manually operable means acting also to swing the support hook out of engagement with said pin whereby said trailer hitch structure may be lowered by said power lift means and said support hook having a cam face arranged to contact said pin when said trailer hitch means is raised by said power lift means, whereby the hook is displaced against the action of spring means to permit said trailer hitch means to be brought to a fully raised position by said power lift means and thereafter said hook is caused to resume an operative position under the action of said spring means to engage said pin when the trailer hitch means is lowered from its fully raised position by the power lift means.

15. In a vehicle having a frame, draft means and hitch means movably connected to said frame, link means releasably and movably connectable in one position to said draft means and in another position to said hitch means for principally vertically moving said hitch means, lift means supported by said frame and connected with said link means for effecting movement thereof, the arm means releasably and movably connectable with said link means and said frame when said link means is in its other position.

References Cited by the Examiner

UNITED STATES PATENTS

| 2,786,695 | 3/1957 | Wilson | 280—479 |
| 2,912,258 | 11/1959 | Maughan | 280—479 |

LEO FRIAGLIA, *Primary Examiner.*

A. HARRY LEVY, BENJAMIN HERSH, *Examiners.*

R. C. PODWIL, *Assistant Examiner.*